US012561039B2

(12) United States Patent
Krabach et al.

(10) Patent No.: US 12,561,039 B2
(45) Date of Patent: Feb. 24, 2026

(54) GENERATIVE MODEL WITH WHITEBOARD

(71) Applicant: Microsoft Technology Licensing, LLC,
Redmond, WA (US)

(72) Inventors: Brian Scott Krabach, Snohomish, WA
(US); Umesh Madan, Bellevue, WA
(US); Samuel Edward Schillace,
Portola Valley, CA (US)

(73) Assignee: Microsoft Technology Licensing, LLC,
Redmond, WA (US)

( * ) Notice: Subject to any disclaimer, the term of this
patent is extended or adjusted under 35
U.S.C. 154(b) by 174 days.

(21) Appl. No.: 18/485,928

(22) Filed: Oct. 12, 2023

(65) Prior Publication Data

US 2025/0123724 A1 Apr. 17, 2025

(51) Int. Cl.
*G06F 3/0481* (2022.01)
*G06F 40/20* (2020.01)

(52) U.S. Cl.
CPC ............ *G06F 3/0481* (2013.01); *G06F 40/20*
(2020.01)

(58) Field of Classification Search
CPC ............................... G06F 3/0481; G06F 40/20
See application file for complete search history.

(56) References Cited

U.S. PATENT DOCUMENTS

| | | | |
|---|---|---|---|
| 2018/0292964 A1 | 10/2018 | Snyder | |
| 2020/0403817 A1* | 12/2020 | Daredia | ................ G10L 15/083 |
| 2022/0084524 A1* | 3/2022 | Hou | ......................... G06F 16/31 |
| 2024/0380800 A1* | 11/2024 | Bryan | ................... G06F 3/0484 |

OTHER PUBLICATIONS

Fowler, Martin, et al., "An Example of LLM Prompting for Programming", [Retrieved on Nov. 21, 2024] Retrieved from the URL: https://martinfowler.com/articles/2023-chatgpt-xu-hao.html, Apr. 13, 2023, 11 pages.
Geuß, Martin, et al., "Microsoft Whiteboard: Mit KI Zu Besseren Brainstormings", [Retrieved on Nov. 20, 2024] Retrieved from URL: https://www.drwindows.de/news/microsoft-whiteboard-mit-ki-zu-besseren-brainstorming, May 9, 2023, 6 Pages.
(Continued)

*Primary Examiner* — Haoshian Shih
(74) *Attorney, Agent, or Firm* — Alleman Hall LLP

(57) ABSTRACT

A computing system is provided, including processing circuitry configured to cause an interaction interface for a trained generative model to be presented, in which the interaction interface is configured to communicate a portion of a user interaction history. The processing circuitry is further configured to receive, via the interaction interface, an input for the trained generative model to generate an output. The processing circuitry is further configured to send a command to create, via the trained generative model or another trained generative model, a whiteboard based on the user interaction history and receive the created whiteboard. The processing circuitry is further configured to generate a prompt based on the whiteboard and the instruction from the user and provide the prompt to the trained generative model. The processing circuitry is further configured to receive a response from the trained generative model and output the response via the interaction interface.

20 Claims, 9 Drawing Sheets

(56) References Cited

OTHER PUBLICATIONS

International Search Report and Written Opinion received for PCT Application No. PCT/US2024/047344, Dec. 5, 2024, 17 pages.

Reines, Mary, "Collaboration App Stormboard Brings AI to virtual whiteboard, TechTarget", [Retrieved on Nov. 21, 2024] Retrieved from URL: https://www.techtarget.com/searchunifiedcommunications/news/366537942/Collaboration-app-Stormboard-brings-AI-to virtual-whiteboard, May 19, 2023, 6 Pages.

Weatherbed, Jess, "Microsoft 365's AI-powered Copilot Gains New Features as Preview Expands—The Verge", May 9, 2023, Retrieved from the URL: https://www.theverge.com/2023/5/9/23716591/microsoft-365-copilot-preview-expansion-ai-features-paid-access [Retrieved on Nov. 21, 2024], 8 pages.

Chan, et al., "ChatEval: Towards Better LLM-based Evaluators through Multi-Agent Debate", In Repository of arXiv:2308.07201v1, Aug. 14, 2023, 16 Pages.

Wu, et al., "AutoGen: Enabling Next-Gen LLM Applications via Multi-Agent Conversation Framework", In Repository of arXiv:2308.08155v1, Aug. 16, 2023, 28 Pages.

Arshad, Mohammad, "Meet Flows: A Revolutionary AI Framework for Modeling Complex AI-Human Interactions", Retrieved from: https://www.marktechpost.com/2023/08/12/meet-flows-a-revolutionary-ai-framework-for-modeling-complex-ai-human-interactions/, Aug. 12, 2023, 2 Pages.

Zeng, et al., "What is Azure Machine Learning Prompt Flow (preview)", Retrieved from: https://learn.microsoft.com/en-us/azure/machine-learning/prompt-flow/overview-what-is-prompt-flow?view=azureml-api-2, Jul. 2, 2023, 3 Pages.

* cited by examiner

GUI 90

WHITEBOARD
ACTION ITEM: DECIDE DESTINATION MONTEREY IS DESTINATION
CURRENT TOPIC: VACATION

106

60

CHAT HISTORY

40

WHAT ARE SOME POPULAR SPRING BREAK VACATIONS?

HOW ABOUT SAN DIEGO OR MONTEREY, CALIFORNIA?

TELL ME MORE ABOUT VACATIONS TO MONTEREY

GUI 90

WHITEBOARD VERSION HISTORY 116

| No. | MODIFIED | MODIFIED BY | SIZE | COMMENTS |
|-----|----------|-------------|------|----------|
| 3.0 | 09/01/2023 | XXXXXXX | 400 KB | UPDATED INTRO |
| 2.0 | 06/01/2023 | XXXXXXX | 500 KB | UPDATED INTRO |
| 1.0 | 01/01/2023 | XXXXXXX | 500 KB | |

200

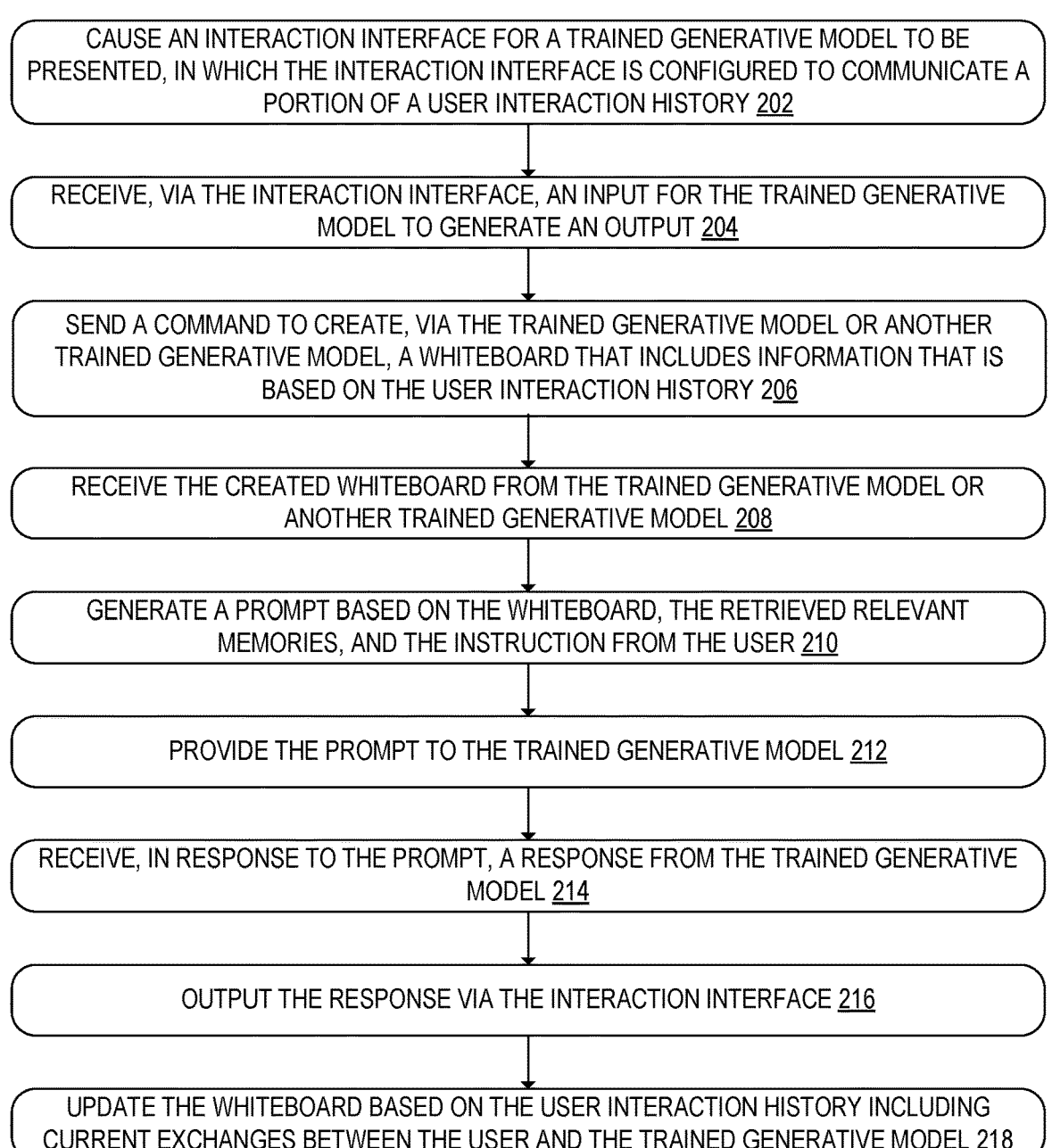

CAUSE AN INTERACTION INTERFACE FOR A TRAINED GENERATIVE MODEL TO BE PRESENTED, IN WHICH THE INTERACTION INTERFACE IS CONFIGURED TO COMMUNICATE A PORTION OF A USER INTERACTION HISTORY 202

RECEIVE, VIA THE INTERACTION INTERFACE, AN INPUT FOR THE TRAINED GENERATIVE MODEL TO GENERATE AN OUTPUT 204

SEND A COMMAND TO CREATE, VIA THE TRAINED GENERATIVE MODEL OR ANOTHER TRAINED GENERATIVE MODEL, A WHITEBOARD THAT INCLUDES INFORMATION THAT IS BASED ON THE USER INTERACTION HISTORY 206

RECEIVE THE CREATED WHITEBOARD FROM THE TRAINED GENERATIVE MODEL OR ANOTHER TRAINED GENERATIVE MODEL 208

GENERATE A PROMPT BASED ON THE WHITEBOARD, THE RETRIEVED RELEVANT MEMORIES, AND THE INSTRUCTION FROM THE USER 210

PROVIDE THE PROMPT TO THE TRAINED GENERATIVE MODEL 212

RECEIVE, IN RESPONSE TO THE PROMPT, A RESPONSE FROM THE TRAINED GENERATIVE MODEL 214

OUTPUT THE RESPONSE VIA THE INTERACTION INTERFACE 216

UPDATE THE WHITEBOARD BASED ON THE USER INTERACTION HISTORY INCLUDING CURRENT EXCHANGES BETWEEN THE USER AND THE TRAINED GENERATIVE MODEL 218

CAUSE AN INTERACTION INTERFACE FOR A TRAINED GENERATIVE MODEL TO BE PRESENTED, IN WHICH THE INTERACTION INTERFACE IS CONFIGURED TO COMMUNICATE A PORTION OF A USER INTERACTION HISTORY 302

RECEIVE, VIA THE INTERACTION INTERFACE, AN INPUT FOR THE TRAINED GENERATIVE MODEL TO GENERATE AN OUTPUT 304

SEND A COMMAND TO CREATE, VIA THE TRAINED GENERATIVE MODEL OR ANOTHER TRAINED GENERATIVE MODEL, A WHITEBOARD THAT INCLUDES INFORMATION THAT IS BASED ON THE USER INTERACTION HISTORY 306

DISPLAY THE WHITEBOARD IN THE GUI OF THE INTERACTION INTERFACE 308
DISPLAY THE WHITEBOARD ALONG WITH THE INPUT AND THE OUTPUT IN THE GUI 310

UPDATE THE WHITEBOARD BASED ON THE USER INTERACTION HISTORY INCLUDING CURRENT EXCHANGES BETWEEN THE USER AND THE TRAINED GENERATIVE MODEL 312

RECEIVE, VIA AN EDITING TOOL OF THE GUI, USER INPUT TO MODIFY THE DISPLAYED WHITEBOARD, TO THEREBY CREATE A USER-MODIFIED WHITEBOARD 314

FIG. 7

GENERATIVE MODEL WITH WHITEBOARD

BACKGROUND

Large language models (LLMs) have been recently developed that generate natural language responses in response to prompts entered by users. LLMs are routinely incorporated into chatbots, which are computer programs designed to interact with users in a natural, conversational manner. Chatbots facilitate efficient and effective interaction with users, often for the purpose of providing information or answering questions.

Large language models (LLMs) are adept at providing information based on a user's question and context, including an interaction history between the user and the model. However, the size of the user interaction history that can be passed to the LLM is limited, which can lead to information loss. To overcome this limitation, synthetic memory extraction and retrieval systems store and retrieve relevant synthetic memories. However, this approach subjects the stored information to potential loss due to reformulation and/or consolidation by a generative model. Additionally, the information stored in this way might be difficult to locate as relevant using conventional vector search techniques. Therefore, a technical challenge exists to provide a generative model with a mechanism to remember information pertinent to its own operation without loss of fidelity due to contextual overlength or information loss during synthetic memory extraction and retrieval.

SUMMARY

A computing system for incorporating a whiteboard into a trained generative model is provided. According to one aspect, the computing system includes processing circuitry configured to cause an interaction interface for the trained generative model to be presented, in which the interaction interface is configured to communicate a portion of a user interaction history. The processing circuitry is further configured to receive, via the interaction interface, an input for the trained generative model to generate an output. The processing circuitry is further configured to send a command to create, via the trained generative model or another trained generative model, a whiteboard that includes information that is based on the user interaction history. The processing circuitry is further configured to receive the created whiteboard from the trained generative model or another trained generative model. The processing circuitry is further configured to generate a prompt based on the whiteboard and the instruction from the user and provide the prompt to the trained generative model. The processing circuitry is further configured to receive, in response to the prompt, a response from the trained generative model and output the response via the interaction interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows a flowchart for a method according to one example implementation.

FIG. 7 shows a flowchart for a method according to another example implementation.

DETAILED DESCRIPTION

Figure 1:
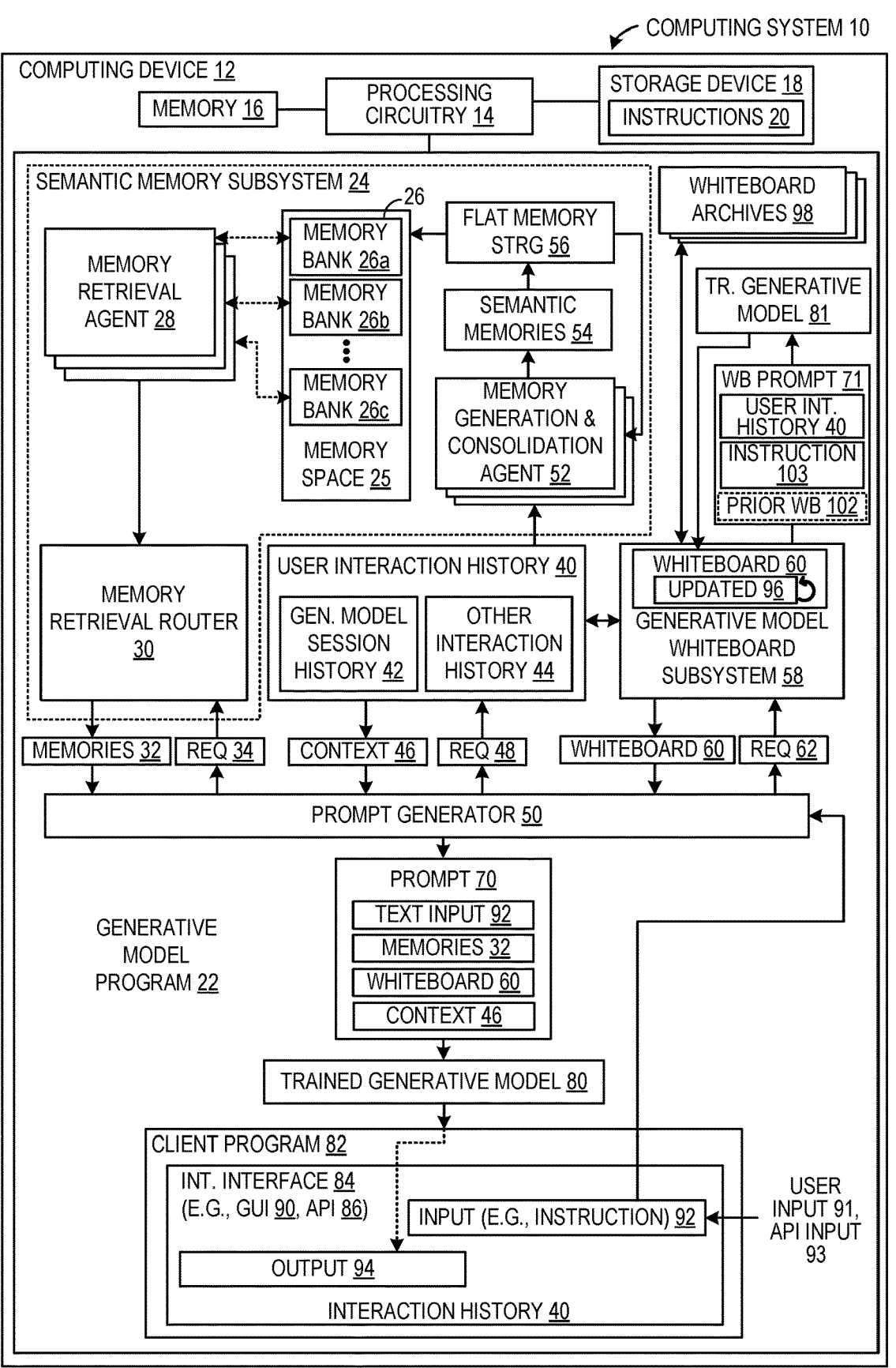
FIG. 1 is a schematic view showing a computing system according to a first example implementation.

To address the issues described above, FIG. 1 illustrates a schematic view of a computing system 10 according to a first example implementation. For the sake of clarity, the trained generative model 80 will be henceforth referred to as a trained generative language model 80. However, it will be noted that the term 'trained generative language model' is merely illustrative, and the underlying concepts encompass a broader range of generative models, including multi-modal models, diffusion models, and generative adversarial networks, which can be configured to receive text, image, and/or audio inputs and generate text, image, and/or audio outputs, as discussed in further detail below.

The computing system 10 includes a computing device 12 having processing circuitry 14, memory 16, and a storage device 18 storing instructions 20. In this first example implementation, the computing system 10 takes the form of a single computing device 12 storing instructions 20 in the storage device 18, including a trained generative model program 22 that is executable by the processing circuitry 14 to perform various functions described herein.

At a high level, the generative model program 22 implements an interaction interface 84 by which a text input (e.g., instruction) 92 is received, and passes the text input 92 to a prompt generator 50, which generates a prompt 70 based on the text input 92. The prompt 70 is input to a trained generative model 80, which in turn generates output 94 which can be passed to an interaction interface 84. In a typical turn-based chat bot implementation, this process can happen multiple times in a session, and the record of multiple text inputs 92 and outputs 94 forms a user interaction history 40, which may include a generative model session history 42 and other interaction histories 44. The full or abbreviated content of the user interaction history 40 can be provided in the context 46 of each prompt 70 sent to the generative model 80, upon receiving a context request 48 from the prompt generator 50, so that subsequent responses can take into account the context 46 of the interaction history

40. The generative model program 22 further generates, via the trained generative model 80 or another trained generative model 81, a whiteboard 60 that includes information that is based on the user interaction history 40. The generation of the whiteboard 60 may be initiated by a whiteboard request 62 sent from the prompt generator 50. The generative model program 22 passes the whiteboard 60 to the prompt generator 50 to generate the prompt 70 which is input to the trained generative model 80, as discussed above. The generative model program 22 further displays the whiteboard 60 along with the input 92 and the output 94 in a graphical user interface (GUI) 90, in which the whiteboard 60 may be modified by a user. It will be appreciated that the prompt 70 may be configured as a Retrieval Augmented Generation (RAG) prompt. Retrieval Augmented Generation (RAG) is a natural language processing technique that combines retrieval and generation models. It uses external sources of information or knowledge to enhance the accuracy and relevance of the generated responses. Furthermore, the prompt 70 may further be generated based on user data. The user data may be, for example, stored in a graph representation and made available via one or more graph API calls made by the answer service to the graph service. The API call can return a graph representation of requested user data, such as requested user profile data, user calendar data, user chat data, user coworker data, user group data, user files, user email messages, user meetings, user tasks, etc. Text in the returned user data from the API call can be included in the prompt 70.

The processing circuitry 14 may be configured to execute a client program 82 to cause an interaction interface 84 for at least a trained generative model 80 to be presented. The interaction interface 84 is configured to communicate a portion of user interaction history 40. Communicating the portion of user interaction history 40 may include displaying or exchanging API messages. As briefly discussed above, the interaction interface 84 may include the graphical user interface (GUI) 90 that is configured to display a portion of the user interaction history on a display, and the input (e.g., instruction) 92 and the output 94 are displayed in the GUI 90. The interaction interface 84 may be configured to receive user input 91 and visually present information to the user. In other instances, the interaction interface 84 may be presented in non-visual formats such as an audio interface for receiving and/or outputting audio, such as may be used with a digital assistant. In yet another example the interaction interface 84 may be implemented as an application programming interface (API) 86. In such a configuration, the API input 93 to the interaction interface 84 may be made by an API call from a calling software program to the API 86, and output may be returned in an API response from the API 86 to the calling software program.

It will be understood that distributed processing strategies may be implemented to execute the software described herein, and the processing circuitry 14 therefore may include multiple processing devices, such as cores of a central processing unit, co-processors, graphics processing units, field programmable gate arrays (FPGA) accelerators, tensor processing units, etc., and these multiple processing devices may be positioned within one or more computing devices, and may be connected by an interconnect (when within the same device) or via a packet switched network links (when in multiple computing devices), for example. In such implementations, the processing circuitry 14 may be configured to execute the API 86 as the interaction interface 84 for the trained generative language model 80.

The trained generative language model 80 is a generative model that has been configured through machine learning to receive input that includes natural language text and generate output that includes natural language text in response to the input. It will be appreciated that the trained generative language model 80 can be a large language model (LLM) having tens of millions to billions of parameters, non-limiting examples of which include GPT-3, BLOOM, and LLaMA-2. The trained generative language model 80 can be a multi-modal generative model configured to receive multi-modal input including natural language text input as a first mode of input and image, video, or audio as a second mode of input, and generate output including natural language text based on the multi-modal input. The output of the multi-modal model may additionally include a second mode of output such as image, video, or audio output. Non-limiting examples of multi-modal generative models include Kosmos-2 and GPT-4 VISUAL. Further, the trained generative language model 80 can be configured to have a generative pre-trained transformer architecture, examples of which are used in the GPT-3 and GPT-4 models.

The processing circuitry 14 may be configured to receive, via the interaction interface 84, the input 92 for the trained generative model 80 to generate the output 94. The input 92 is natural language text input that may be received from a human user or may also be generated by and received from a software program. The processing circuitry 14 may be further configured to send a command to create, via the trained generative model 80 or another trained generative model 81, the whiteboard 60 that includes information that is based on the user interaction history 40, and receive the created whiteboard 60 from the trained generative model 80 or another trained generative model 81. The information of the whiteboard 60 may be text-based. For example, the whiteboard 60 may be natural language text generated by a generative model and/or modified by a user. The whiteboard 60 may also be represented as tokenized text, i.e., tokens or token equivalents. The processing circuitry 14 may be configured to create the whiteboard 60 at least in part by (1) generating a whiteboard generation prompt 71 including the user interaction history 40, and a whiteboard generation instruction 103, (2) passing the whiteboard generation prompt to the trained generative model 80 or the another trained generative model 81, and (3) in response, receiving the whiteboard 60 from the trained generative model 80 or the another trained generative model 81. It will be appreciated that the whiteboard generation prompt 71 may be generated to further include a prior version of the whiteboard 102, and the received whiteboard may be an updated version of the whiteboard 60.

The whiteboard 60 may include information relevant to the current task at hand, which is extracted from the user interaction history 40. The user interaction history 40 may include a chat history of a communication program 112. The whiteboard 60 may be continuously available to the trained generative model 80. The whiteboard 60 may be limited in size, in which the whiteboard generation instruction 103 may include a natural language text command to limit the whiteboard 60 to a predetermined threshold size, which may be defined as a maximum number of characters, words, tokens or token equivalents, or bytes, for example.

The processing circuitry 14 may be configured to generate the prompt 70 based on the created whiteboard 60 and the input (e.g., instruction) 92 from the user, and provide the prompt 70 to the trained generative model 80. The processing circuitry 14 may be configured to receive, in response to the prompt 70, a response 94 from the trained generative model 80, and output the response 94 via the interaction interface 84.

The processing circuitry 14 may be further configured to update, via a generative model whiteboard subsystem 58, the whiteboard 60 based on the user interaction history 40 including current exchanges between the user and the trained generative model 80.

Furthermore, the processing circuitry 14 may be configured to archive the whiteboard 60 in response to determining that a similarity between the whiteboard 60 and the updated whiteboard 96 exceeds a predetermined archiving similarity threshold, and store a plurality of whiteboard archives 98.

The processing circuitry 14 may be further configured to retrieve and replace a current version of the whiteboard 60 with an archived version of the whiteboard 60, in response to determining that a replace-with-archive condition is met. The replace-with-archive condition may be met upon receiving a user request to replace the current version of the whiteboard 60, or when a similarity measure between instances of the whiteboard exceeds a predetermined replacement similarity threshold. Similarities between whiteboards may be determined using similarity algorithms, which may encompass a variety of computational techniques, which may include but are not limited to character-based, word-based, token-based, or semantic-based similarity algorithms.

Moreover, the generative model program 22 can leverage a semantic memory subsystem 24 to incorporate relevant memories 32 into the prompt 70 that is passed to the trained generative model 80. The semantic memory subsystem 24 may not only stores memories from user interactions in memory banks 26a-c in memory space 25, but also uses a memory retrieval router 30 and a memory retrieval agent 28 to intelligently retrieve relevant memories 32 from the memory banks 26a-c in a targeted manner to input the relevant memories 32 into the trained generative model 80. Accordingly, questions from users may be appropriately answered and users' inquiries may be fulfilled in a personalized and contextually appropriate fashion.

The memories in the memory banks 26 may be generated and consolidated from the user interaction history 40 via a memory generation and consolidation agent 52 to form semantic memories 54, which may be stored in the memory space 25 of flat memory storage 56.

The processing circuitry 14 may be configured to generate a memory request 34 including the context 46 and the instruction 92, and input the memory request 34 into the semantic memory subsystem 24 to retrieve one or more relevant memories 32 from associated memory banks 26 of the subsystem 24 such that the relevant memories 32 are additionally included in the prompt 70 that is passed to the trained generative model 80. However, instead of being passed to the semantic memory subsystem 24, the whiteboard 60 is passed to the prompt generator 50 and the trained generative model 80. Accordingly, the whiteboard 60 may be configured to be a separate indicator of the "state" of the conversation between the generative model 80 and the user, which is maintained separately from the memories 32 that are extracted and stored, and later retrieved, by the memory retrieval agent 28. It will be also appreciated that the semantic memory subsystem 24 may be omitted from the computing system 10 in alternative embodiments, and the prompt 70 may be generated based on the whiteboard 60 without the semantic memory subsystem 24.

Figure 2:
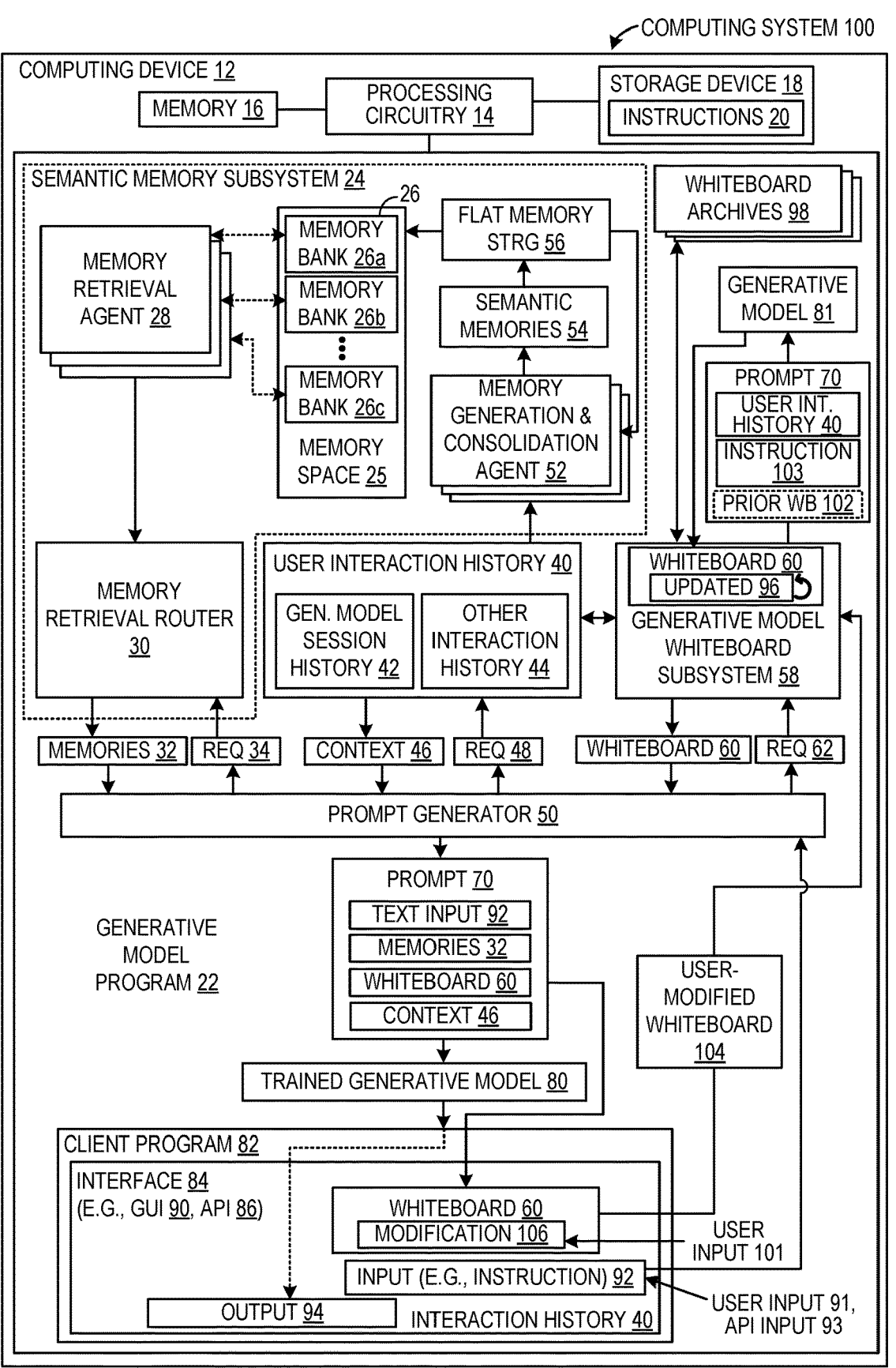
FIG. 2 is a schematic view showing a computing system according to a second example implementation.
Figures 4A, 4B:
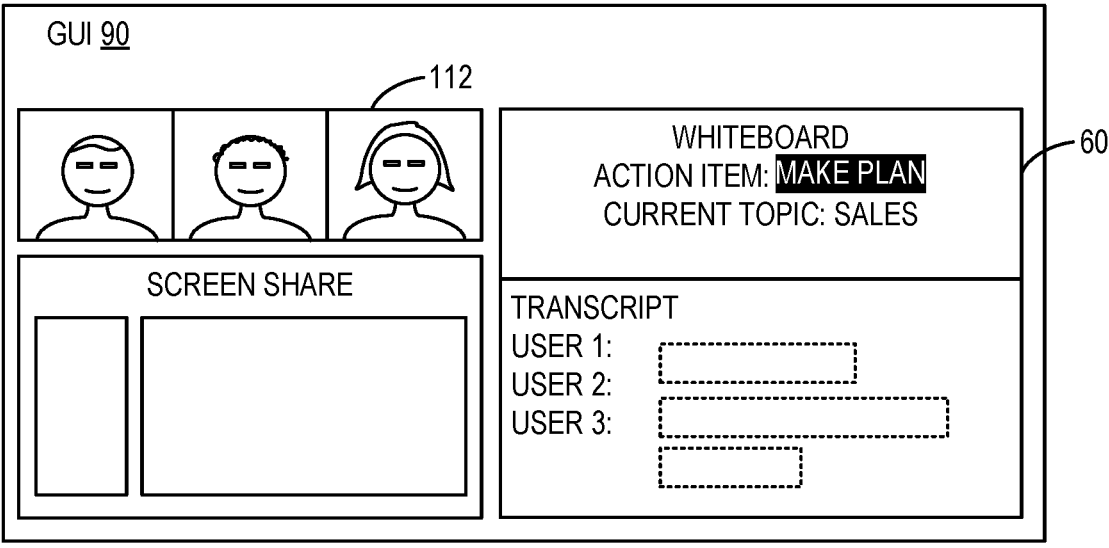
FIG. 4A shows an example graphical user interface (GUI) of the computing system of FIG. 2, displaying a whiteboard according to an example implementation.
FIG. 4B shows an example graphical user interface (GUI) of the computing system of FIG. 2, illustrating a modification of the displayed whiteboard via user input according to an example implementation.

FIG. 2 illustrates a schematic view showing a computing system 100 according to the second example implementation. With this implementation, in addition to the features provided by the computing system 10 of FIG. 1, the processing circuitry 14 may be configured to display the whiteboard 60 along with the input 92 and output 94 in the GUI 90 of the interaction interface 84. Accordingly, the user may receive a visual indication of the whiteboard 60 in the GUI 90. Turning briefly to FIG. 4A, a schematic view is shown of an exemplary GUI 90 that displays the whiteboard 60 according to an example implementation. The whiteboard 60 is displayed as a part of a communication program 112 that implements the generative model program 22 of FIG. 2. In the depicted example, the whiteboard 60 stipulates that the action item is "make plan" and the current topic is "sales." These key information may be extracted from the user interaction history of the communication program 112.

Returning to FIG. 2, the processing circuitry 14 may be further configured to receive, via an editing tool of the GUI 90, a user input 101 to modify the displayed whiteboard 60 to thereby create a user-modified whiteboard 104. The user-modified whiteboard 104 is transmitted to the generative model whiteboard subsystem 58. Accordingly, the user may not only check the whiteboard 60, but also directly modify the whiteboard 60. Turning briefly to FIG. 4B, a schematic view is shown of an exemplary GUI 90 that illustrates a modification 106 of the displayed whiteboard 60 via user input 101 according to an example implementation. In this depicted example, the whiteboard 60 originally stipulates that the action item is "decide destination" and the current topic is "vacation," and "decide destination" is modified to "Monterey is destination" by a direct input of the user.

Figure 3A:
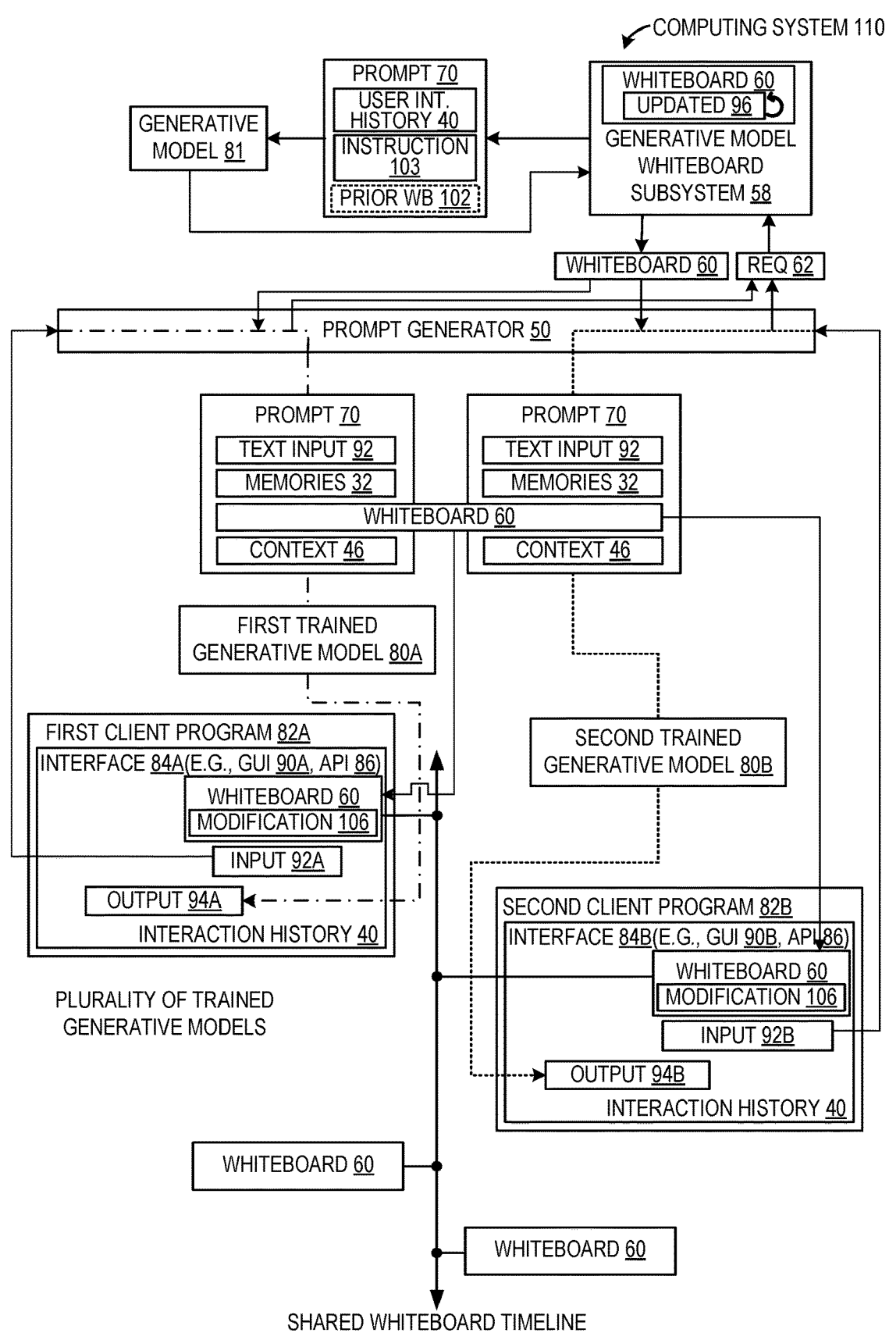
FIGS. 3A and 3B illustrate a plurality of trained generative models sharing a whiteboard according to an example implementation.
Figure 3B:
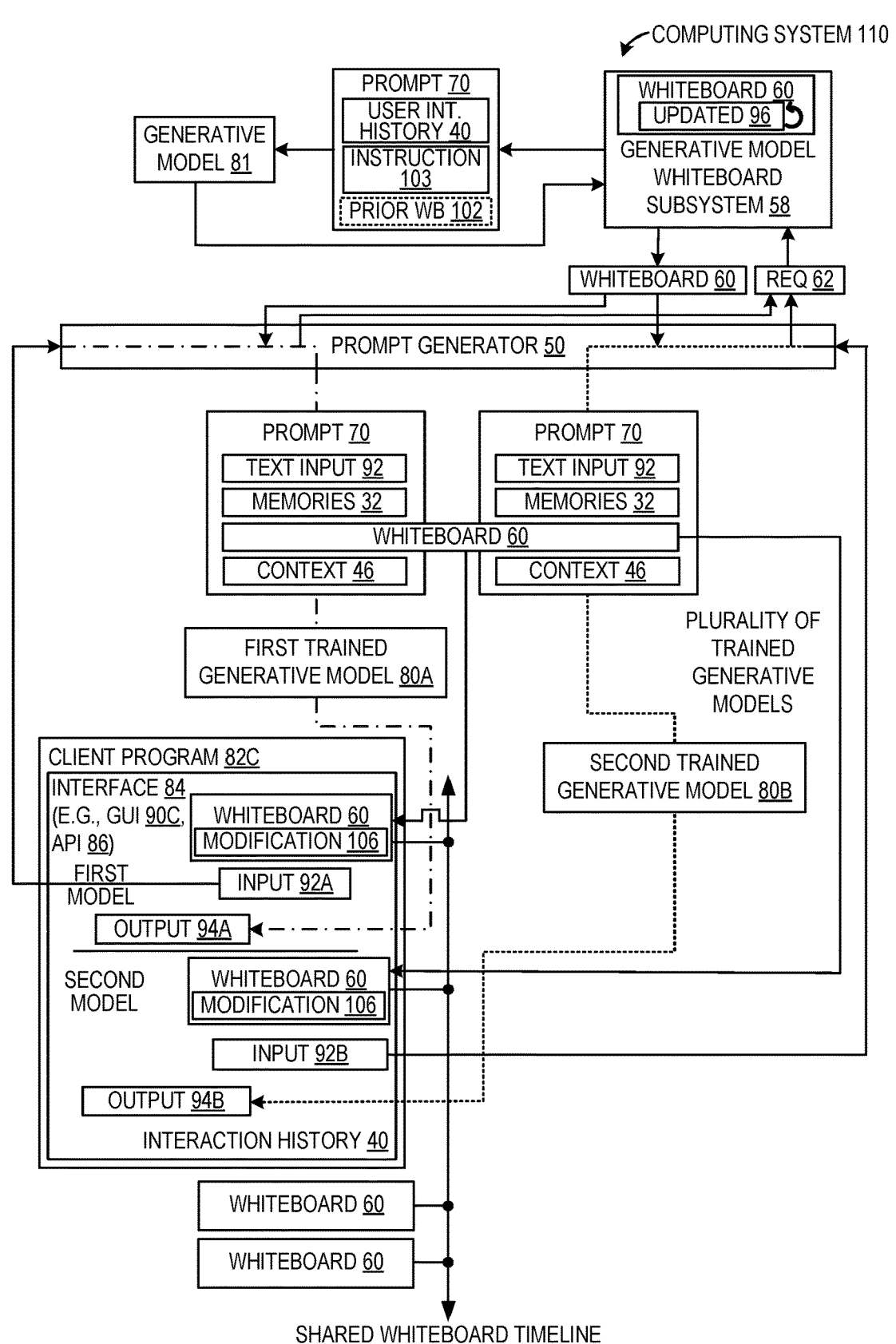

FIGS. 3A and 3B illustrate a computing system 110 featuring a plurality of trained generative models including a first trained generative model 80A and a second trained generative model 80B that share the whiteboard 60 according to an example implementation. It will be appreciated computing system 110 is similar to computing systems 10 and 100 described above, except in the respects described below. Similar features of the computing system 110 in FIGS. 3A and 3B with the computing systems 10, 100 of FIGS. 1 and 2 will not be redescribed for the sake of brevity. Specifically computing system 110 can include a semantic memory subsystem 24, whiteboard archives, and generative model 81 although those components are omitted in FIGS. 3A and 3B. The processing circuitry 14 (see FIGS. 1 and 2) is configured to receive a first input 92A of the user interaction history 40 for the first trained generative model 80A. The processing circuitry 14 is further configured to send a first command to create, via the first trained generative model 80A or another trained generative model 81, a first instance of the whiteboard 60, in which the command includes at least a portion of the user interaction history 40. The processing circuitry 14 is further configured to receive the first instance of the whiteboard 60. The processing circuitry 14 is further configured to receive a second input 92B of the user interaction history 40 for the second trained generative model 80B. The processing circuitry 14 is further configured to send a second command to create, via the second trained generative model 80B or the another trained generative model 81, a second instance of the whiteboard 60, in which the command includes at least a portion of the user interaction history 40 for the second trained generative model 80B and the first instance of the whiteboard 60. The processing circuitry 14 is further configured to receive the second instance of the whiteboard 60 and display the second instance of the whiteboard 60 in the graphical user interface (GUI) 90 of the interaction interface 84.

In this way, the whiteboard 60 may be shared by each of the plurality of models, as each can read from and write to the whiteboard. Each of the plurality of models uses the generative model whiteboard subsystem 58, which calls the generative model 81 using a prompt 70, to generate an instance of the whiteboard. These instances are arranged along a timeline, and there is an instance that represents the current version of the whiteboard. Since each model can both read the whiteboard when generating output as well as write to the current version of the whiteboard using the model's respective context and user interaction history, the plurality of models can exchange state information with each other using the whiteboard 60. While typically each model can opportunistically rewrite the entire contents of the whiteboard 60, whiteboard prompts can be designed that summarize the prior content and add additional content, so that some content is retained from instance to instance of the whiteboard written by different models.

As shown in FIG. 3A, the first instance of the whiteboard 60 may be displayed in the GUI 90 of a first client program 82A and the second instance of the whiteboard 60 may be displayed in the GUI 90 of a second client program 82B. According to this implementation, the processing circuitry 14 is further configured to execute the first client program 82A that communicates with the first trained generative model 80A and the second client program 82B that communicates with the second trained generative model 80B. The first client program 82A displays a first GUI 90A and the second client program 82B displays a second GUI 90B. The user interaction history 40 for the first trained generative model 80A is displayed in the first GUI 90A of the first client program 82A. The user interaction history 40 for the second trained generative model 80B is displayed in the second GUI 90B of the second client program 82B. The first user input 92A is received in the first GUI 90A of the first client program 82A, and the second user input 92B is received in the second GUI 90B of the second client program 82B. The first instance of the whiteboard 60 is displayed in the first GUI 90A of the first client program 82A, and the second instance of the whiteboard 60 is displayed in the second GUI 90B of the second client program 82B. In this way, the whiteboard 60 is shared and updated between the first trained generative model 80A and the second trained generative model 80B, as shown on a shared whiteboard timeline, with the contents of the different instances of the whiteboard being shown in interfaces of different programs.

Alternatively, as shown at FIG. 3B, the first instance and the second instance of the whiteboard 60 may be displayed in the GUI 90 of a single client program 82. According to this implementation, the processing circuitry 14 is configured to execute the client program 82C that communicates with both the first trained generative model 80A and the second trained generative model 80B and that displays a shared GUI 90C as the interaction interface 84. The user interaction history 40 for the first trained generative model 80A and the user interaction history 40 for the second trained generative model 80B are a shared user interaction history displayed in the shared GUI 90C of the client program 82C. Furthermore, the first user input 92A and the second user input 92B are each received via the shared GUI 90C, and the first instance of the whiteboard 60 and the second instance of the whiteboard 60 are both displayed in the shared GUI 90C. The whiteboard 60 is shared and updated between the first trained generative model 80A and the second trained generative model 80B, as shown on the shared whiteboard timeline, with the contents of the different instances of the whiteboard 60 shown in the same interface of a program. It will be appreciated that in addition to display of the whiteboard, both the client programs 82A, 82B of FIG. 3A, and the client program 82C of FIG. 3B can be configured to receive user modifications 106 of the instances of whiteboard 60, similar to computer system 100 of FIG. 2.

Figures 5A, 5B:
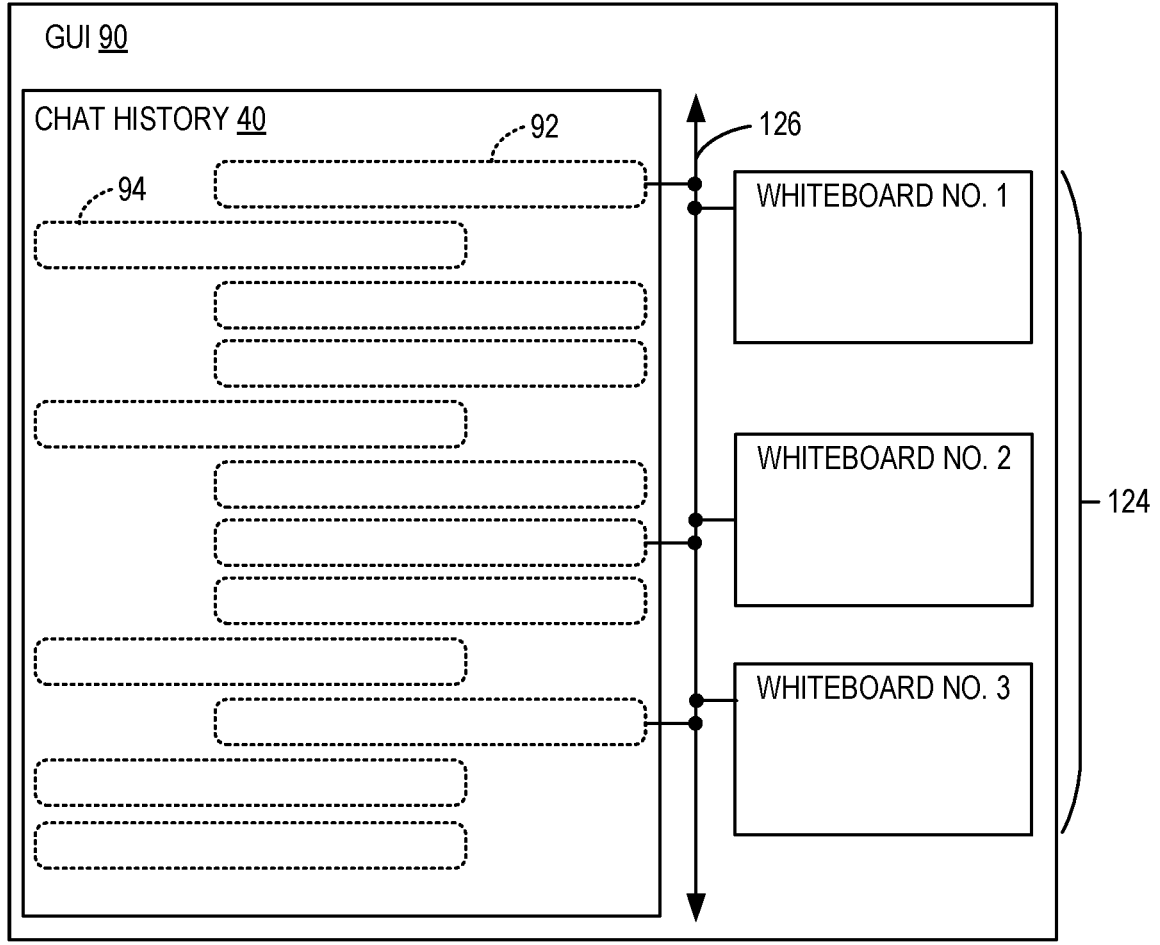
FIGS. 5A and 5B show an example graphical user interface (GUI) of the computing system of FIG. 2, illustrating a whiteboard version history according to an example implementation.

Turning to FIGS. 5A and 5B, these figures show an example GUI 90 that illustrates a whiteboard version history 116 according to an example implementation, in which the processing circuitry 14 of FIG. 2 is further configured to display archived whiteboards in the plurality of whiteboard archives 98 in the GUI 90, along with timeline information indicating a time at which each of the archived whiteboards 124 was created. In the depicted example of FIG. 5A, the displayed whiteboard version history 116 includes a list of archived whiteboards in the plurality of whiteboard archives 98 in the GUI 90. The whiteboard version history 116 includes version, modified date, and size information. In the depicted example of FIG. 5B, the archived whiteboards 124 are displayed in the GUI 90, along with timeline information 126 indicating a time at which each of the archived whiteboards 124 was created. The GUI 90 also includes a history of inputs 92 and outputs 94 arranged in a time order, and a plurality of the archived whiteboards 124 correspondingly arranged in the time order so that the archived whiteboards are displayed adjacent the inputs 92 and outputs 94 with similar time stamps, i.e. from which the archived whiteboards 124 were created.

FIG. 6 shows a flowchart for a method 200 for creating a whiteboard that includes information that is based on the user interaction history. The method 200 may be implemented by the computing system 10 illustrated in FIG. 1, or via other suitable hardware and software.

At step 202, an interaction interface for a trained generative model is presented, in which the interaction interface is configured to communicate a portion of a user interaction history. At step 204, an input for the trained generative model is received via the interaction interface to generate an output. At step 206, a command to create, via the trained generative model or another trained generative model, a whiteboard that includes information that is based on the user interaction history is sent. At step 208, the created whiteboard from the trained generative model or another trained generative model is received. At step 210, a prompt is generated based on the whiteboard, the retrieved relevant memories, and the instruction from the user. At step 212, the prompt to the trained generative model is provided. At step 214, in response to the prompt, a response from the trained generative model is received. At step 216, the response is output via the interaction interface. At step 218, the whiteboard is updated based on the user interaction history, including current exchanges between the user and the trained generative model.

The computing system 10 and method 200 described herein provide mechanisms for creating the whiteboard based on the user interaction history and generating the prompt based on the whiteboard. By using the whiteboard, it is possible to observe and summarize ongoing conversations without directly transcribing them. The system and method also generate prompts based on the whiteboard, which can help a bot to provide an answer more effectively.

FIG. 7 shows a flowchart for a method 300 for displaying and modifying the whiteboard. The method 300 may be implemented by the computing system 100 illustrated in FIG. 2 or via other suitable hardware and software.

At step 302, an interaction interface for a trained generative model is presented, in which the interaction interface is configured to communicate a portion of a user interaction history. At step 304, an input for the trained generative model is received via the interaction interface to generate an output. At step 306, a command is sent to create, via the trained generative model or another trained generative model, a whiteboard that includes information that is based on the user interaction history. At step 308, the whiteboard is displayed in the GUI of the interaction interface. Step 308 may include step 310, in which the whiteboard is displayed along with the input and the output in the GUI. At step 312, the whiteboard is updated based on the user interaction history including current exchanges between the user and the trained generative model. At step 314, user input to modify the displayed whiteboard is received via an editing tool of the GUI to create a user-modified whiteboard.

The computing system 100 and method 300 described herein provide mechanisms for displaying the whiteboard in the GUI and enabling a user to modify the whiteboard, in addition to creating the whiteboard. By allowing the user to see and modify the whiteboard, the bot can generate a whiteboard that reflects the user's interaction history.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
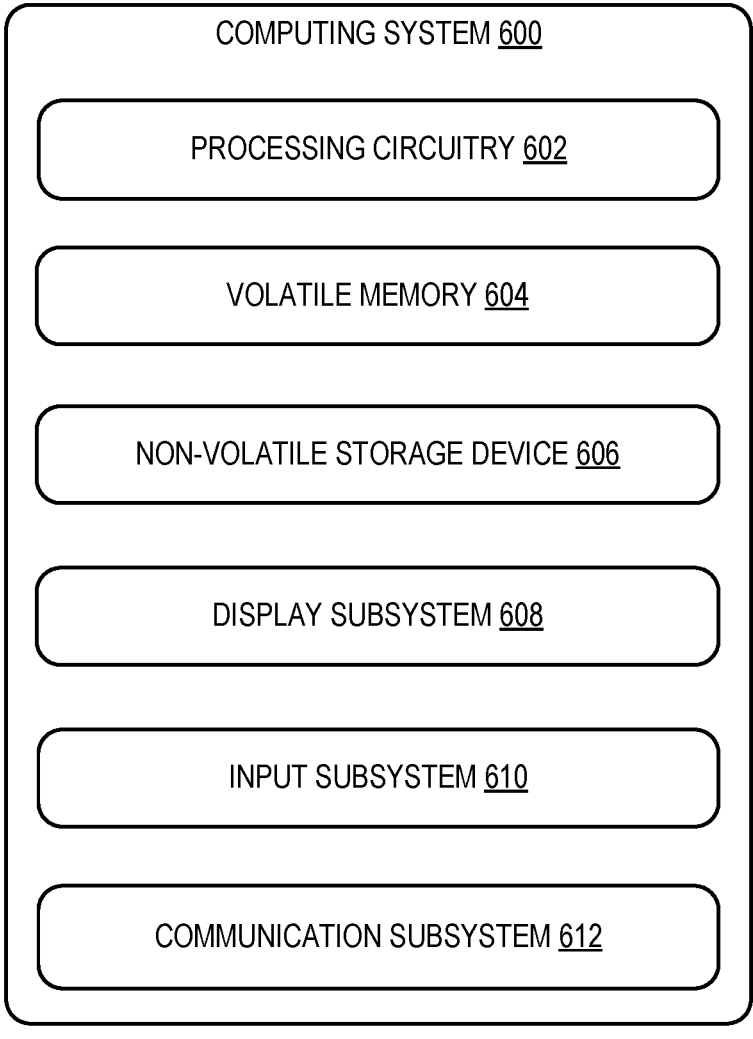
FIG. 8 shows a schematic view of an example computing environment in which the computing system of FIG. 1 or FIG. 2 may be enacted.

FIG. 8 schematically shows a non-limiting embodiment of a computing system 600 that can enact one or more of the methods and processes described above. Computing system 600 is shown in simplified form. Computing system 600 may embody the computing system 10 described above and illustrated in FIG. 1 or the computing system 100 described above and illustrated in FIG. 2. Components of computing system 600 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 600 includes a processing circuitry 602, volatile memory 604, and a non-volatile storage device 606. Computing system 600 may optionally include a display subsystem 608, input subsystem 610, communication subsystem 612, and/or other components not shown in FIG. 1 or 2.

Processing circuitry 602 typically includes one or more logic processors, which are physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 602.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built in. Non-volatile storage device 606 may include optical memory, semiconductor memory, and/or magnetic memory, or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by processing circuitry 602 to temporarily store information during processing of software instructions. It will be appreciated that volatile memory 604 typically does not continue to store instructions when power is cut to the volatile memory 604.

Aspects of processing circuitry 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via processing circuitry 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with processing circuitry 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, camera, or microphone.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 600 to send and/or receive messages to and/or from other devices via a network such as the Internet.

The following paragraphs provide additional support for the claims of the subject application. One aspect provides a computing system. According to this aspect, the computing system may include processing circuitry configured to cause an interaction interface for a trained generative model to be presented, in which the interaction interface may be configured to communicate a portion of a user interaction history. The processing circuitry may be further configured to receive, via the interaction interface, an input for the trained generative model to generate an output. The processing circuitry may be further configured to send a command to create, via the trained generative model or another trained generative model, a whiteboard that includes information that is based on the user interaction history. The processing circuitry may be further configured to receive the created whiteboard from the trained generative model or another trained generative model. The processing circuitry may be further configured to generate a prompt based on the whiteboard and an instruction from the user. The processing circuitry may be further configured to provide the prompt to the trained generative model. The processing circuitry may be further configured to receive, in response to the prompt, a response from the trained generative model. The processing circuitry may be further configured to output the response via the interaction interface.

According to this aspect, the processing circuitry may be further configured to create the whiteboard at least in part by (1) generating a whiteboard generation prompt including the user interaction history, and a whiteboard generation instruction, (2) passing the whiteboard generation prompt to the trained generative model or the another trained generative model, and (3) in response, receiving the whiteboard from the trained generative model or the another trained generative model.

According to this aspect, the whiteboard generation prompt may be generated to further include a prior version of the whiteboard, and the received whiteboard is an updated version of the whiteboard.

According to this aspect, the processing circuitry may be further configured to update the whiteboard based on the user interaction history including current exchanges between the user and the trained generative model.

According to this aspect, the processing circuitry may be further configured to archive the whiteboard in response to determining that a similarity between the whiteboard and the updated whiteboard exceeds a predetermined archiving similarity threshold.

According to this aspect, the processing circuitry may be further configured to retrieve and replace a current version of the whiteboard with an archived version of the whiteboard, in response to determining that a replace-with-archive condition is met.

According to this aspect, the whiteboard may be limited in size.

According to this aspect, the processing circuitry may be further configured to create the whiteboard at least in part by generating a whiteboard generation instruction, and the whiteboard generation instruction may include natural language text command to limit the whiteboard in size.

According to this aspect, the processing circuitry may be further configured to generate a memory request including the context and the instruction, and input the memory request into a semantic memory subsystem to retrieve one or more relevant memories from associated memory banks of the subsystem, in which the relevant memories may be additionally included in the prompt passed to the trained generative model, and the whiteboard may not be passed to the semantic memory subsystem.

According to this aspect, the interaction interface may include a graphical user interface (GUI) that is configured to display the portion of the user interaction history, and the input and the output may be displayed in the GUI.

According to another aspect of the present disclosure, a computerized method is provided. According to this aspect, the computerized method may include causing an interaction interface for a trained generative model to be presented, in which the interaction interface may be configured to communicate a portion of a user interaction history. The computerized method may further include receiving, via the interaction interface, an input for the trained generative model to generate an output. The computerized method may further include sending a command to create, via the trained generative model or another trained generative model, a whiteboard that includes information that is based on the user interaction history. The computerized method may further include receiving the created whiteboard from the trained generative model or another trained generative model. The computerized method may further include generating a prompt based on the whiteboard, the retrieved relevant memories, and an instruction from the user. The computerized method may further include providing the prompt to the trained generative model. The computerized method may further include receiving, in response to the prompt, a response from the trained generative model. The computerized method may further include outputting the response via the interaction interface.

According to this aspect, the whiteboard may be created at least in part by (1) generating a whiteboard generation prompt including the user interaction history, and a whiteboard generation instruction, (2) passing the whiteboard generation prompt to the trained generative model or the another trained generative model, and (3) in response, receiving the whiteboard from the trained generative model or the another trained generative model.

According to this aspect, the whiteboard generation prompt may be generated to further include a prior version of the whiteboard, and the received whiteboard is an updated version of the whiteboard.

According to this aspect, the computerized method may further include updating the whiteboard based on the user interaction history including current exchanges between the user and the trained generative model.

According to this aspect, the whiteboard generation instruction may include natural language text command to limit the whiteboard in size.

According to this aspect, the whiteboard may be archived in response to determining that a similarity between the whiteboard and the updated whiteboard exceeds a predetermined archiving similarity threshold.

According to this aspect, a current version of the whiteboard may be replaced with an archived version of the whiteboard, in response to determining that a replace-with-archive condition is met.

According to this aspect, the interaction interface may include a graphical user interface (GUI) that is configured to display the portion of the user interaction history, and the input and the output may be displayed in the GUI.

According to another aspect of the present disclosure, a computing system is provided. According to this aspect, the computing system may include processing circuitry configured to cause an interaction interface for a trained generative model to be presented, in which the interaction interface may be configured to communicate a portion of a user interaction history. The processing circuitry may be further configured to receive, via the interaction interface, an input for the trained generative model to generate an output. The processing circuitry may be further configured to send a command to create, via the trained generative model or another trained generative model, a whiteboard that includes information that is based on the user interaction history. The processing circuitry may be further configured to receive the created whiteboard from the trained generative model or another trained generative model. The processing circuitry may be further configured to update the whiteboard based on the user interaction history including current exchanges between the user and the trained generative model. The processing circuitry may be further configured to archive the whiteboard in response to determining that a similarity between the whiteboard and the updated whiteboard exceeds a predetermined archiving similarity threshold.

According to this aspect, the processing circuitry may be further configured to retrieve and replace a current version of the whiteboard with an archived version of the whiteboard, in response to determining that a replace-with-archive condition is met.

According to another aspect of the present disclosure, a computing system is provided. According to this aspect, the computing system may include processing circuitry configured to cause an interaction interface for a trained generative model to be presented, in which the interaction interface may be configured to communicate a portion of a user interaction history. The processing circuitry may be further configured to receive, via the interaction interface, an input for the trained generative model to generate an output. The processing circuitry may be further configured to send a command to create, via the trained generative model or another trained generative model, a whiteboard that includes information that is based on the user interaction history. The processing circuitry may be further configured to display the whiteboard in the GUI of the interaction interface.

According to this aspect, the whiteboard may be displayed along with the input and the output in the GUI.

According to this aspect, the processing circuitry may be further configured to receive, via an editing tool of the GUI, user input to modify the displayed whiteboard, to thereby create a user-modified whiteboard.

According to this aspect, the processing circuitry may be further configured to update the whiteboard based on the user interaction history including current exchanges between the user and the trained generative model.

According to this aspect, the processing circuitry may be further configured to archive the whiteboard in response to determining that a similarity between the whiteboard and the updated whiteboard exceeds a predetermined archiving similarity threshold.

According to this aspect, the processing circuitry may be further configured to store a plurality of whiteboard archives and display archived whiteboards in the plurality of whiteboard archives in the GUI, along with timeline information indicating a time at which each of the archived whiteboards was created.

According to this aspect, the processing circuitry may be further configured to retrieve and replace a current version of the whiteboard with an archived version of the whiteboard, in response to determining that a replace-with-archive condition is met.

According to this aspect, the processing circuitry may be further configured to generate a prompt based on the whiteboard and an instruction from the user.

According to this aspect, the user interaction history may include a chat history of a communication program.

According to this aspect, the whiteboard may be displayed as a part of a communication program in the GUI.

According to this aspect, the whiteboard may be limited in size.

According to another aspect of the present disclosure, a computerized method is provided. According to this aspect, the computerized method may include causing an interaction interface for a trained generative model to be presented, in which the interaction interface may be configured to communicate a portion of a user interaction history. The computerized method may further include receiving, via the interaction interface, an input for the trained generative model to generate an output. The computerized method may further include sending a command to create, via the trained generative model or another trained generative model, a whiteboard that includes information that is based on the user interaction history. The computerized method may further include displaying the whiteboard in the GUI of the interaction interface.

According to this aspect, the whiteboard may be displayed along with the input and the output in the GUI.

According to this aspect, the method may further include receiving, via an editing tool of the GUI, user input to modify the displayed whiteboard, to thereby create a user-modified whiteboard.

According to this aspect, the method may further include updating the whiteboard based on the user interaction history including current exchanges between the user and the trained generative model.

According to this aspect, the updated whiteboard may be displayed along with the input and the output in the GUI.

According to this aspect, the whiteboard may be limited in size.

According to another aspect of the present disclosure, a computing system is provided. According to this aspect, the computing system may include processing circuitry configured to receive a first input of a user interaction history for a first trained generative model. The processing circuitry may be further configured to send a first command to create, via the first trained generative model or another trained generative model, a first instance of a whiteboard, in which the command may include at least a portion of the user interaction history. The processing circuitry may be further configured to receive the first instance of the whiteboard. The processing circuitry may be further configured to receive a second input of the user interaction history for a second trained generative model. The processing circuitry may be further configured to send a second command to create, via the second trained generative model or the another trained generative model, a second instance of the whiteboard, in which the command may include at least a portion of the user interaction history for the second trained generative model and the first instance of the whiteboard. The processing circuitry may be further configured to receive the second instance of the whiteboard. The processing circuitry may be further configured to display the second instance of the whiteboard in a graphical user interface of the interaction interface.

According to this aspect, the processing circuitry may be further configured to execute a first client program that communicates with the first trained generative model and a second client program that communicates with the second trained generative model. The first client program may display a first graphical user interface (GUI). The second client program may display a second GUI. The user interaction history for the first trained generative model may be displayed in the first GUI of the first client program. The user interaction history for the second trained generative model may be displayed in the second GUI of the second client program. The first user input may be received in the first GUI of the first client program. The second user input may be received in the second GUI of the second client program. The first instance of the whiteboard may be displayed in the first GUI of the first client program. The second instance of the whiteboard may be displayed in the second GUI of the second client program.

According to this aspect, the processing circuitry may be further configured to execute a client program that communicates with both the first trained generative model and the second trained generative model and that displays a shared graphical user interface as the interaction interface. The user interaction history for the first trained generative model and the user interaction history for the second trained generative model may be a shared user interaction history displayed in the shared graphical user interface of the client program. The first user input and the second user input may be each received via the shared graphical user interface. Both the first instance of the whiteboard and the second instance of the whiteboard may be displayed in the shared graphical user interface.

"And/or" as used herein is defined as the inclusive or ∨, as specified by the following truth table:

| A | B | A ∨ B |
|---|---|-------|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
processing circuitry configured to:
   cause an interaction interface for a trained generative model to be presented, the interaction interface being configured to communicate a portion of a user interaction history;
   receive, via the interaction interface, an input for the trained generative model to generate an output to be included in the user interaction history;
   send a command to create, via the trained generative model or another trained generative model, a whiteboard that includes information that is based on the output in the user interaction history;
   receive the created whiteboard from the trained generative model or another trained generative model;
   generate a prompt configured to be input to the trained generative model, the prompt including the whiteboard and an instruction from the user received via the interaction interface;
   provide the prompt to the trained generative model;
   receive, in response to the prompt, a response from the trained generative model; and
   output the response via the interaction interface.

2. The computing system of claim 1, wherein the processing circuitry is configured to create the whiteboard at least in part by (1) generating a whiteboard generation prompt including the user interaction history, and a whiteboard generation instruction, (2) passing the whiteboard generation prompt to the trained generative model or the another trained generative model, and (3) in response, receiving the whiteboard from the trained generative model or the another trained generative model.

3. The computing system of claim 2, wherein the whiteboard generation prompt is generated to further include a prior version of the whiteboard, and the received whiteboard is an updated version of the whiteboard.

4. The computing system of claim 1, wherein the processing circuitry is further configured to update the whiteboard based on the user interaction history including current exchanges between the user and the trained generative model.

5. The computing system of claim 4, wherein the processing circuitry is further configured to archive the whiteboard in response to determining that a similarity between the whiteboard and the updated whiteboard exceeds a predetermined archiving similarity threshold.

6. The computing system of claim 5, wherein the processing circuitry is further configured to retrieve and replace a current version of the whiteboard with an archived version of the whiteboard, in response to determining that a replace-with-archive condition is met.

7. The computing system of claim 1, wherein the whiteboard is limited in size.

8. The computing system of claim 7,
wherein the processing circuitry is configured to create the whiteboard at least in part by generating a whiteboard generation instruction, and wherein the whiteboard generation instruction includes natural language text command to limit the whiteboard in size.

9. The computing system of claim 1, wherein the processing circuitry is further configured to:

generate a memory request including the context and the instruction; and input the memory request into a semantic memory subsystem to retrieve one or more relevant memories from associated memory banks of the subsystem, wherein the relevant memories are additionally included in the prompt passed to the trained generative model, and wherein the whiteboard is not passed to the semantic memory subsystem.

10. The computing system of claim 1, wherein the interaction interface includes a graphical user interface (GUI) that is configured to display the portion of the user interaction history, and the input and the output are displayed in the GUI.

11. A computerized method, comprising:

causing an interaction interface for a trained generative model to be presented, the interaction interface being configured to communicate a portion of a user interaction history;

receiving, via the interaction interface, an input for the trained generative model to generate an output to be included in the user interaction history;

sending a command to create, via the trained generative model or another trained generative model, a whiteboard that includes information that is based on the output in the user interaction history;

receiving the created whiteboard from the trained generative model or another trained generative model;

generating a prompt configured to be input to the trained generative model, the prompt including the whiteboard and an instruction from the user received via the interaction interface;

providing the prompt to the trained generative model;

receiving, in response to the prompt, a response from the trained generative model; and outputting the response via the interaction interface.

12. The computerized method of claim 11, wherein the whiteboard is created at least in part by (1) generating a whiteboard generation prompt including the user interaction history, and a whiteboard generation instruction, (2) passing the whiteboard generation prompt to the trained generative model or the another trained generative model, and (3) in response, receiving the whiteboard from the trained generative model or the another trained generative model.

13. The computerized method of claim 12, wherein the whiteboard generation prompt is generated to further include a prior version of the whiteboard, and the received whiteboard is an updated version of the whiteboard.

14. The computerized method of claim 11, wherein the method further includes updating the whiteboard based on the user interaction history including current exchanges between the user and the trained generative model.

15. The computerized method of claim 11, wherein the whiteboard generation instruction includes natural language text command to limit the whiteboard in size.

16. The computerized method of claim 11, wherein the whiteboard is archived in response to determining that a similarity between the whiteboard and the updated whiteboard exceeds a predetermined archiving similarity threshold.

17. The computerized method of claim 16, wherein a current version of the whiteboard is replaced with an archived version of the whiteboard, in response to determining that a replace-with-archive condition is met.

18. The computerized method of claim 11, wherein the interaction interface includes a graphical user interface (GUI) that is configured to display the portion of the user interaction history, and the input and the output are displayed in the GUI.

19. A computing system, comprising:

processing circuitry configured to:

cause an interaction interface for a trained generative model to be presented, the interaction interface being configured to communicate a portion of a user interaction history;

receive, via the interaction interface, an input for the trained generative model to generate an output included in the user interaction history;

send a command to create, via the trained generative model or another trained generative model, a whiteboard that includes information that is based on the output in the user interaction history;

receive the created whiteboard from the trained generative model or another trained generative model;

update the whiteboard based on the user interaction history including current exchanges between the user and the trained generative model; and archive the whiteboard in response to determining that a similarity between the whiteboard and the updated whiteboard exceeds a predetermined archiving similarity threshold.

20. The computing system of claim 19, wherein the processing circuitry is further configured to retrieve and replace a current version of the whiteboard with an archived version of the whiteboard, in response to determining that a replace-with-archive condition is met.

* * * * *